UNITED STATES PATENT OFFICE.

DAMEN R. AVERILL, OF NEW CENTREVILLE, NEW YORK.

IMPROVEMENT IN THE MANUFACTURE OF PAINTS.

Specification forming part of Letters Patent No. 121,478, dated December 5, 1871.

*To all whom it may concern:*

Be it known that I, DAMEN R. AVERILL, of New Centreville, in the county of Oswego and State of New York, have invented certain new and useful Improvements in the Manufacture of Paints; and I do hereby aver that the following is a full and exact description thereof.

This invention relates to the manufacture of paints which possess the peculiar property of not running when applied, spreading freely when used thick, drying readily, and is less expensive than ordinary paints in use. The distinguishing feature of this invention consists in wetting the body or base of the paint with an aqueous solution of any gelatinous, resinous, balsamic, or farinaceous preparation, or their equivalents, which will form an emulsion when mixed with linseed-oil, such as lime-water, soap-water, or other alkaline material, and then adding such a quantity of linseed-oil or its oleaginous equivalents, with or without spirits of turpentine, benzine, or naphtha, as will render it of sufficient consistency for the purpose desired.

As one of many formulas which may be employed for preparing this paint one example will be given, viz.: First take one hundred pounds of the oxide of zinc, or other body or base used in paints, and mix with it about three gallons of gelatinous, resinous, balsamic, farinaceous water, or lime-water, soap-water, or other alkaline material of sufficient strength to form an emulsion with linseed-oil if mixed with it and well agitated; then add sufficient linseed or other drying oil, or its equivalent, with or without the addition of turpentine or benzine, to form a paint suited to the purpose required.

It is evident that the agents herein named, and others not cited, may be employed either separately or combined without changing the nature of this invention—aqueous solutions of the chloride of sodium, lime, magnesium, barium, strontium, saccharine solutions, various hydro-alcoholic extracts; also, the various salts of the alkalies or alkaline earths, with the mineral or organic acids. Various other aqueous solutions may be engaged in place of the said aqueous solutions of gelatine, &c.

What I claim as my invention, and desire to secure by Letters Patent, is—

The method of uniting the bases or bodies of paints with watery solutions, oils, and pigments, the same consisting in first wetting the oxide of zinc, carbonate of lead, or other material to form the body of the paint, with either or several of the solutions herein named, and then adding a drying oil or oleaginous compound so as to form a paint, substantially as set forth.

DAMEN R. AVERILL.

Witnesses:
W. H. BURRIDGE,
D. W. CURTIS.